Figure 1:
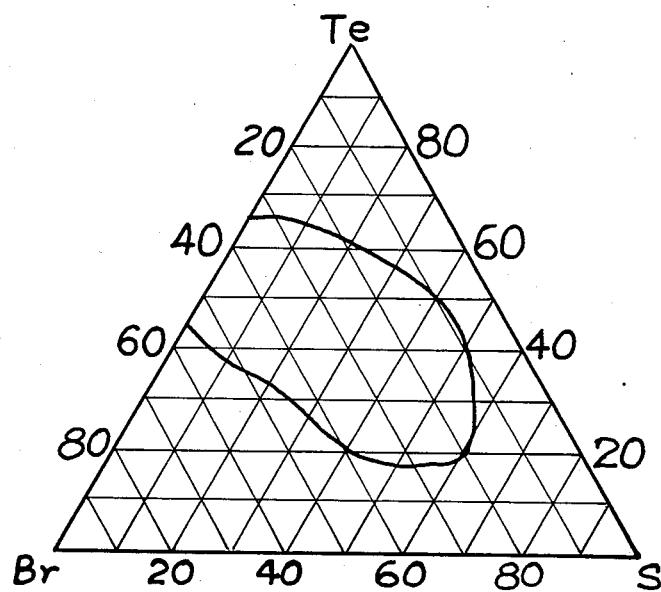

United States Patent [19]

Lucas et al.

[11] Patent Number: 4,745,090
[45] Date of Patent: May 17, 1988

[54] GLASSES BASED ON TELLURIUM HALIDES, THEIR PREPARATION AND THEIR USE PRINCIPALLY IN THE OPTOELECTRONIC AND INFRA-RED TRANSMISSION FIELD

[75] Inventors: Jacques Lucas, Betton; Xiang H. Zhang, Rennes, both of France

[73] Assignee: Centre National de la Recherche Scientifique (CNRS), Paris, France

[21] Appl. No.: 12,393

[22] Filed: Feb. 9, 1987

[30] Foreign Application Priority Data

Feb. 7, 1986 [FR] France ................ 86 01683

[51] Int. Cl.[4] ................ C03C 3/32; C03C 13/00
[52] U.S. Cl. ................ 501/40; 501/35; 501/904
[58] Field of Search ................ 501/40, 904, 35

[56] References Cited

U.S. PATENT DOCUMENTS

| | | | |
|---|---|---|---|
| 2,883,295 | 4/1959 | Jerger, Jr. ................ | 501/40 |
| 3,117,013 | 1/1964 | Northover et al. ................ | 501/40 |
| 3,241,009 | 3/1966 | Dewald et al. ................ | 501/40 |
| 3,448,425 | 6/1969 | Shanefield et al. ................ | 501/40 |
| 3,709,813 | 1/1973 | Johnson et al. ................ | 501/40 |

OTHER PUBLICATIONS

Chemical Abstracts, vol. 82, No. 2, 1985, p. 407, No. 10326t, "Vitrification, Switching and Memory Effects of Glasses in Potassium-Arsenic (Antimony) Sulfur Selenium, Tellurium)-Bromine (Iodine)Systems", Khiminets et al.

Journal of Applied Chemistry of the USSR, vol. 48, No. 6, 1975, pp. 1408–1409, "Chemical Stability of Chalcohalide Glasses in Quaternary Systems of the Type $K-A^V-B^{VI}-C^{VII}$" Turyanista et al.

Primary Examiner—Mark L. Bell
Attorney, Agent, or Firm—Cushman, Darby & Cushman

[57] ABSTRACT

A solid vitreous composition has the formula: $Te_{100-x-z}X_xZ_z$ wherein x represents chlorine, bromine or iodine, Z represents sulfur and/or selenium; x represents the molar percentage of X and ranges from 5 to 67; z represents the molar percentage of Z and ranged from 0 to 60; it being understood that the sum (x+z) ranges from 33 to 85. A method for the preparation of this composition is disclosed as is its use in the field of optoelectronics and infra-red transmission.

9 Claims, 2 Drawing Sheets

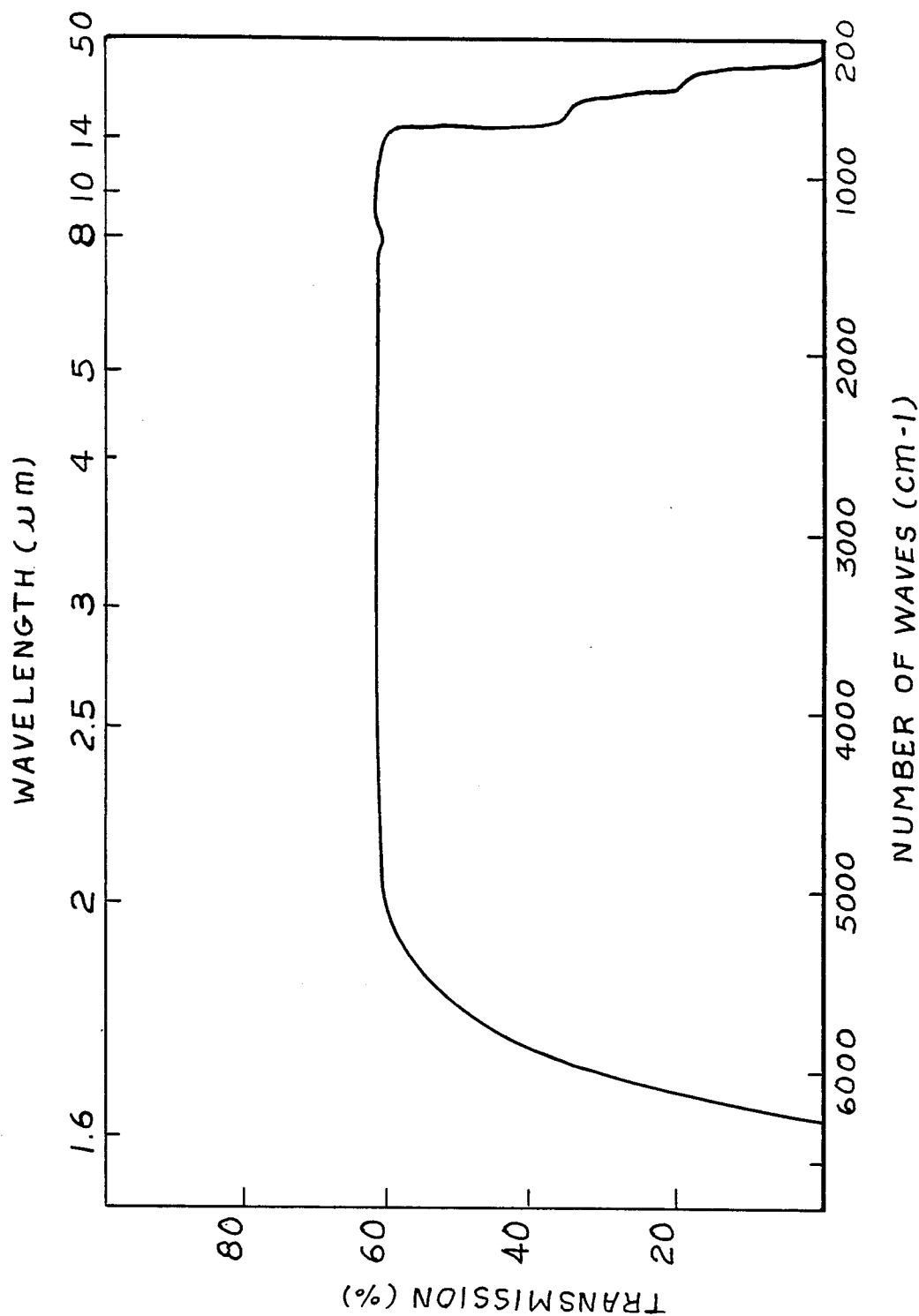

GLASSES BASED ON TELLURIUM HALIDES, THEIR PREPARATION AND THEIR USE PRINCIPALLY IN THE OPTOELECTRONIC AND INFRA-RED TRANSMISSION FIELD

The present invention relates to new glasses based on tellurium halides, their preparation and their use principally in the optoelectronic and infra-red transmission field.

Diagrams of crystallized liquid-solid phase of Te-TeCl$_4$ and Te-TeBr$_4$ systems are known. See, for example, A. Rabenau et al., Z. anorg. Allg. Chem. 395, 273–279 (1973).

It has now been discovered that there exists in tellurium-halogen systems a sufficiently large vitreous zone which permits the production of glasses having, principally, semi-conductor properties. These semi-conductor glasses, which exhibit a quasi-total absorption of visible and infra-red light, can be doped principally with small amounts of sulfur or selenium. Moreover, it has now also been discovered that it is possible to improve the infra-red transmission of these glasses by the simple addition of a supplemental element such as sulfur or selenium.

For these tellurium-halogen-sulfur (or selenium) systems, no crystallization has been observed.

The glasses obtained in accordance with the present invention are transmitters of infra-red in the band of wavelengths ranging from about 8 to 16 μm, and in particular in the 8–12 μm window. These glasses can then be used principally in infra-red devices using lasers with CO$_2$ emitting at 10.6 μm.

The present invention thus relates to solid vitreous compositions of formula I:

$$Te_{100-x-z}X_xZ_z \quad (I)$$

wherein
X represents at least one halogen selected from chlorine, bromine and iodine,
Z represents sulfur and/or selenium,
x is a number representing the molar percentage of the element X and varying from 5 to 67,
z is a number representing the molar percentage of the element Z and varying from 0 to 60,
it being understood that the sum (x+z) varies from 33 to 85.

Representative glasses of formula I include, in particular, those for which X represents chlorine; representative ones of these glasses include in particular, those which are free of sulfur and selenium, and for which x ranges from about 40 to 67; these glasses have semi-conductor properties and can be used principally in optoelectronics in systems employing photoconduction phenomena.

Glasses of the Te-Br system (X=Br) free of sulfur and selenium are in particular those which contain from about 33 to 55 mole percent of bromine.

The invention also relates to glasses, such as defined above, containing several halogens.

Representative glasses containing sulfur and/or selenium, include in particular those for which z ranges from 5 to 60 and in particular those for which z ranges from 10 to 30. As indicated above, these glasses have good infra-red transmission properties.

It has been noted that the addition of sulfur or selenium modifies only very slightly the softening temperature of tellurium-halogen glasses.

For example, for the glass Te$_3$Cl$_2$, Tg=78° C., and for the glass Te$_3$Cl$_2$S, Tg=81° C.; for the glass Te$_3$Br$_2$, Tg=60° C., and for the glass Te$_3$Br$_2$S, Tg=62° C.; for the glass Te$_3$I$_2$, Tg=41° C., and for the glass Te$_3$I$_2$S, Tg=40° C.

The present invention also related to a process for preparing the glass compositions defined above.

This process comprises mixing tellurium with a halogen source and optionally with sulfur and/or selenium in the desired proportions (indicated by formula I); heating the resulting mixture in an inert atmosphere or under a vacuum at a temperature sufficient to completely melt the starting materials, homogenizing the resulting liquid and cooling the homogenized liquid to obtain a vitreous solid.

Preferably, the reaction is carried out in a sealed tube, after having evacuated it. For example, pyrex glass tubes can be used.

The halogen source is the halogen itself or even TeCl$_4$.

Generally, the mixture of starting materials is heated to a temperature ranging from 200° to 300° C. The cooling operation does not generally require tempering. It is sufficient simply to let the composition cool until it reaches ambient temperature.

The glass compositions of the present invention can be obtained principally in the form of massive pieces, fibers or thin layers, in accordance with known procedures.

They can in particular be fibers and serve as a waveguide for light transmitted by lasers with CO$_2$. Moreover, their wide transmission band permits their use in devices for analysis of infra-red rays or thermic chromoprinting.

Figure 2:
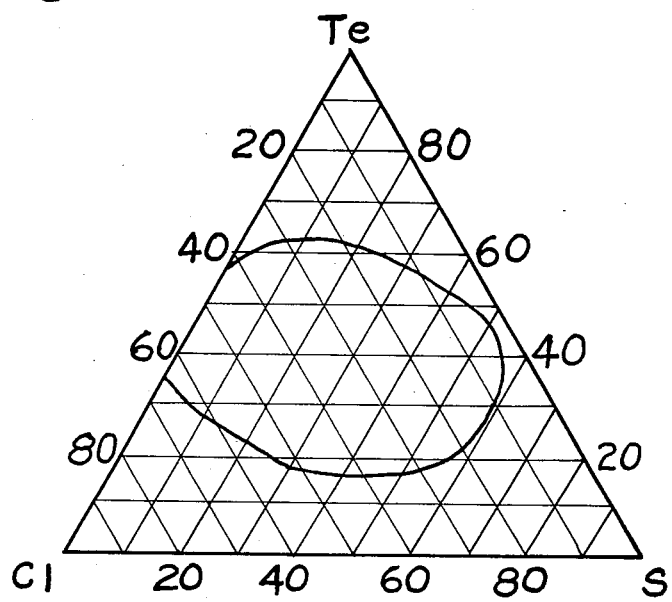

The following Figures represent:
FIG. 1—the diagram of the vitreous field of the Te-Br-S system,
FIG. 2—the diagram of the vitreous field of the Te-Cl-S system;
FIG. 3—the infra-red transmission spectrum of a glass having the composition, Te$_3$Cl$_2$S.

The following nonlimiting examples illustrate the present invention.

EXAMPLE 1

A mixture of tellurium (Merck; 99.99% pure) and TeCl$_4$ (Merck; 99% pure) in molar proportions of 60:40, respectively, is heated in a sealed tube under a vacuum at a temperature of 250°–300° C. The mixture is then homogenized by stirring for 2 hours. Thereafter the homogenized mixture is slowly cooled (5° C./min., for example), without tempering, yielding a vitreous material having the formula Te$_3$Cl$_2$. The resulting glass which is black and non-hygroscopic can be manipulated and polished in air. Its characteristic temperatures are: T$_g$=78° C.; T$_c$=189° C.; T$_f$=242° C.

This glass has semi-conductor properties (gap=about 0.8 electron-volt), which makes it useful as a photoconductor for wavelengths lower than 1.5 micrometer.

EXAMPLE 2

In a similar manner, the glass, TeCl has been prepared. This glass is black in color and has the following characteristic temperatures: T$_g$=65° C.; T$_c$=183° C.; T$_f$=237° C.

EXAMPLE 3

In a similar manner, the glass, TeCl$_2$ is prepared. This glass is hygroscopic and must then be manipulated in a dry atmosphere.

EXAMPLES 4–7

Liquid bromine is directly combined with tellurium in a sealed glass tube; heated to 300° C. for 10 hours and constantly stirred. The resulting homogenized mixture is cooled to ambient temperature, yielding the following glasses:

| Example | Te 100-x | Br x |
|---|---|---|
| 4 | 66.7 | 33.3 |
| 5 | 60 | 40 |
| 6 | 50 | 50 |
| 7 | 45 | 55 |

EXAMPLE 8

In a manner similar to that described in Example 1, by incorporating appropriate amounts of sulfur into a mixture of Te and TeCl$_4$ corresponding to the proportions Te$_3$Cl$_2$, the glass, Te$_3$Cl$_2$S is prepared and is characterized by a softening temperature (Tg) of 81° C. for a temperature elevation rate of 5° C. per minute. No crystallization for this composition was observed although the beginning of decomposition was observed at about 200° C. (under argon).

FIG. 3 represents the transmission spectrum of this glass in the infra-red.

EXAMPLES 9–15

In a manner similar to that of Example 8 the following glasses, whose respective amounts of Te and Cl correspond to Te$_3$Cl$_2$, were prepared:

| Example | Te 100-x-z | Cl x | S z |
|---|---|---|---|
| 9 | 54.6 | 36.4 | 9 |
| 10 | 51.7 | 34.5 | 13.8 |
| 11 | 46.1 | 30.8 | 23.1 |
| 12 | 42.8 | 28.6 | 28.6 |
| 13 | 37.5 | 25 | 37.5 |
| 14 | 33.3 | 22.2 | 44.5 |
| 15 | 30 | 20 | 50 |

EXAMPLES 16–19

These examples concern glasses having the formula M$_3$Cl$_2$ (wherein M=Te+S). Glasses having the following compositions were prepared:

| Example | Te 100-x-z | Cl x | S z |
|---|---|---|---|
| 16 | 50 | 10 | 40 |
| 17 | 40 | 20 | 40 |
| 18 | 30 | 30 | 40 |
| 19 | 20 | 40 | 40 |

EXAMPLES 20–29

In a similar manner glasses having the following compositions were prepared:

| Example | Te 100-x-z | Cl x | S z |
|---|---|---|---|
| 20 | 60 | 30 | 10 |
| 21 | 60 | 20 | 20 |
| 22 | 50 | 10 | 40 |
| 23 | 40 | 10 | 50 |
| 24 | 20 | 30 | 50 |
| 25 | 20 | 50 | 30 |
| 26 | 30 | 60 | 10 |
| 27 | 30 | 50 | 20 |
| 28 | 40 | 50 | 10 |
| 29 | 55 | 15 | 30 |

EXAMPLES 30–34

In a similar manner glasses having the following compositions were prepared:

| Example | Te 100-x-z | Br x | S z |
|---|---|---|---|
| 30 | 60 | 30 | 10 |
| 31 | 57.1 | 28.6 | 14.3 |
| 32 | 50 | 25 | 25 |
| 33 | 40 | 20 | 40 |
| 34 | 33.3 | 16.7 | 50 |

EXAMPLES 35–38

In a similar manner glasses having the formula M$_3$Br$_2$ wherein M=Te+S were prepared:

| Example | Te 100-x-z | Br x | S z |
|---|---|---|---|
| 35 | 50 | 10 | 40 |
| 36 | 40 | 20 | 40 |
| 37 | 30 | 20 | 20 |
| 38 | 20 | 40 | .40 |

EXAMPLES 39–44

In a similar manner the following glasses were prepared:

| Example | Te 100-x-z | Br x | S z |
|---|---|---|---|
| 39 | 60 | 20 | 20 |
| 40 | 50 | 10 | 40 |
| 41 | 40 | 10 | 50 |
| 42 | 20 | 20 | 60 |
| 43 | 20 | 30 | 50 |
| 44 | 40 | 50 | 10 |

EXAMPLES 45–50

In a manner similar to that described in Examples 8–15 (by replacing sulfur with selenium) glasses having the following compositions were prepared:

| Example | Te 100-x-z | Cl x | S z |
|---|---|---|---|
| 45 | 54.6 | 36.4 | 9 |
| 46 | 51.7 | 34.5 | 13.8 |
| 47 | 50 | 33.3 | 16.7 |
| 48 | 46.1 | 30.8 | 23.1 |
| 49 | 42.8 | 28.6 | 28.6 |
| 50 | 37.5 | 25 | 37.5 |

EXAMPLES 51–53

By operating in a manner analogous to that described in Example 1 and starting with tellurium and iodine in appropriate amounts, there is obtained, by heating to about 200° C., homogenization at this temperature for 2 hours, then cooling to ambient temperature, a glass of the composition Te₃I₂ (Example 52). By varing the proportions of tellurium and iodine the following glasses were obtained:

| Example | Te 100-x | Br x |
|---|---|---|
| 51 | 66.7 | 33.3 |
| 52 | 60 | 40 |
| 53 | 50 | 50 |

EXAMPLES 54–58

In a manner similar to that described in Examples 8–15, with mixtures of tellurium, iodine and sulfur, glasses having the following compositions were prepared:

| Example | Te 100-x-z | I x | S z |
|---|---|---|---|
| 54 | 54.6 | 36.4 | 9 |
| 55 | 51.7 | 34.5 | 13.8 |
| 56 | 50 | 33.3 | 16.7 |
| 57 | 46.1 | 30.8 | 23.1 |
| 58 | 42.8 | 28.6 | 28.6 |

What is claimed is:

1. A solid vitreous composition having the formula $$Te_{100-x-z}X_xZ_z \qquad (I)$$

wherein
X represents a halogen selected from the group consisting of chlorine, bromine and iodine,
Z represents sulfur and/or selenium,
x is a number representing the molar percentage of the element X and ranging from 5 to 67,
z is a number representing the molar percentage of the element Z and ranging from 0 to 60,
it being understood that the sum (x+z) ranges from 33 to 85.

2. The composition of claim 1 wherein X represents chlorine.

3. The composition of claim 2 free from sulfur and selenium and wherein x ranges from 40 to 67.

4. The composition of claim 1 wherein X represents bromine.

5. The composition of claim 4 free from sulfur and selenium wherein x ranges from 33 to 55.

6. The composition of claim 1 wherein X represents iodine.

7. The composition of claim 1 wherein z ranges from 5 to 60.

8. The composition of claim 7 wherein z ranges from 10 to 30.

9. The composition of claim 1 in the form of a massive piece, fiber or thin layer.

* * * * *